United States Patent
Mijin

(10) Patent No.: US 10,532,751 B2
(45) Date of Patent: Jan. 14, 2020

(54) AIR-CONDITIONING DEVICE FOR VEHICLE

(71) Applicant: Mitsubishi Electric Corporation, Chiyoda-ku, Tokyo (JP)

(72) Inventor: Yukitaka Mijin, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 118 days.

(21) Appl. No.: 15/541,948

(22) PCT Filed: Jan. 12, 2016

(86) PCT No.: PCT/JP2016/050643
§ 371 (c)(1),
(2) Date: Jul. 6, 2017

(87) PCT Pub. No.: WO2016/114251
PCT Pub. Date: Jul. 21, 2016

(65) Prior Publication Data
US 2017/0369080 A1 Dec. 28, 2017

(30) Foreign Application Priority Data
Jan. 13, 2015 (JP) ................. 2015-004286

(51) Int. Cl.
*B60H 1/03* (2006.01)
*B61D 27/00* (2006.01)
*B60H 1/22* (2006.01)

(52) U.S. Cl.
CPC ........ *B61D 27/0036* (2013.01); *B60H 1/03* (2013.01); *B60H 1/034* (2013.01); *B60H 1/22* (2013.01);
(Continued)

(58) Field of Classification Search
CPC ............ B61D 27/0036; B61D 27/0054; B61D 27/0063; B60H 1/034; B60H 1/00878;
(Continued)

(56) References Cited

U.S. PATENT DOCUMENTS 2,102,940 A * 12/1937 Buchanan .......... B61D 27/0036
165/48.1
8,612,092 B2 * 12/2013 Okamoto ........... B60H 1/00735
701/36
(Continued)

FOREIGN PATENT DOCUMENTS

JP 2006-248275 A 9/2006
JP 2008-296646 A 12/2008
(Continued)

OTHER PUBLICATIONS

"JP_2006248275_A_M—Machine Translation.pdf", machine translation, JPO, Dec. 26, 2018.*
(Continued)

*Primary Examiner* — Gregory L Huson
*Assistant Examiner* — Daniel E Namay
(74) *Attorney, Agent, or Firm* — Buchanan Ingersoll & Rooney PC

(57) ABSTRACT

A vehicle air-conditioning apparatus includes: a hot water heater core provided in a hot water circuit in which cooling water circulates in a heat source to recover waste heat of the heat source, and configured to exchange heat between the cooling water heated by the waste heat of the heat source and air to heat the air, thereby heating an inside of a vehicle by using the heated air; a heat pump configured to exchange heat between a refrigerant discharged from a refrigerant compressor and air by using an indoor heat exchanger to heat the air, thereby heating the inside of the vehicle by using the heated air; an electric heater configured to heat air
(Continued)

to heat the inside of the vehicle; and a controller configured to select at least one of the hot water heater core, the heat pump and the electric heater to perform a heating operation.

3 Claims, 3 Drawing Sheets

(52) U.S. Cl.
CPC ..... *B61D 27/0054* (2013.01); *B61D 27/0063* (2013.01); *B60H 2001/2228* (2013.01); *B60H 2001/2246* (2013.01); *B60H 2001/2265* (2013.01)

(58) Field of Classification Search
CPC .... B60H 1/00907; B60H 1/22; B60H 1/2218; B60H 2001/2228; B60H 2001/2246; B60H 2001/2265; B60H 1/03; B61C 7/04; F25B 27/02
USPC .......................................... 237/2 A, 12.3 B
See application file for complete search history.

(56) References Cited

U.S. PATENT DOCUMENTS

| | | | |
|---|---|---|---|
| 2005/0061011 A1* | 3/2005 | Yakumaru | B60H 1/00878 62/238.6 |
| 2005/0241818 A1* | 11/2005 | Yakumaru | B60H 1/004 165/202 |
| 2008/0202722 A1* | 8/2008 | Feuerecker | B60H 1/00907 165/41 |
| 2009/0205350 A1* | 8/2009 | Takahashi | B60H 1/00878 62/238.6 |
| 2010/0326127 A1 | 12/2010 | Oomura et al. | |
| 2011/0016896 A1 | 1/2011 | Oomura et al. | |
| 2012/0304674 A1* | 12/2012 | Schwarzkopf | B60H 1/00385 62/79 |
| 2013/0192271 A1* | 8/2013 | Barnhart | F25B 21/04 62/3.3 |
| 2013/0192272 A1* | 8/2013 | Ranalli | F25B 21/04 62/3.3 |
| 2013/0291577 A1* | 11/2013 | Miyakoshi | B60H 1/00392 62/151 |
| 2014/0060086 A1* | 3/2014 | Ranalli | B60H 1/00478 62/3.3 |
| 2014/0075966 A1* | 3/2014 | Schmitz | B60H 1/00921 62/56 |
| 2014/0102126 A1* | 4/2014 | Aoun | B60H 1/00899 62/244 |
| 2014/0110489 A1* | 4/2014 | Yasui | F02N 11/0833 237/5 |
| 2014/0208793 A1* | 7/2014 | Goenka | F25D 31/00 62/404 |
| 2015/0033782 A1* | 2/2015 | Kondo | B60H 1/00921 62/244 |
| 2015/0075204 A1* | 3/2015 | Brodie | B60H 1/00907 62/324.6 |
| 2015/0183296 A1* | 7/2015 | Ragazzi | B60H 1/03 219/205 |
| 2015/0217622 A1* | 8/2015 | Enomoto | B60H 1/00878 165/42 |
| 2015/0239322 A1* | 8/2015 | Yokoo | F25B 5/04 62/158 |
| 2015/0258875 A1* | 9/2015 | Enomoto | B60L 1/003 165/104.31 |
| 2015/0298523 A1* | 10/2015 | Patel | B60H 1/00778 237/2 A |
| 2016/0031288 A1* | 2/2016 | Nishikawa | F01P 3/20 165/202 |
| 2016/0244052 A1* | 8/2016 | Hirabayashi | B60K 6/445 |
| 2016/0339900 A1* | 11/2016 | Li | B60H 1/004 |
| 2019/0105963 A1* | 4/2019 | Chang | B60H 1/00392 |

FOREIGN PATENT DOCUMENTS

| | | | | |
|---|---|---|---|---|
| JP | 2011005982 A | * | 1/2011 | ............. F25B 41/04 |
| JP | 2012076509 A | * | 4/2012 | ............. B60H 1/004 |

OTHER PUBLICATIONS

"JP_2008296646_A_M—Machine Translation.pdf", machine translation, JPO, Dec. 26, 2018.*
Extended European Search Report dated Aug. 21, 2018, issued by the European Patent Office in corresponding European Application No. 16737322.4. (7 pages).
Office Action dated Jun. 29, 2018, by the Chinese Patent Office in corresponding Chinese Patent Application No. 201680005024.3 and English translation of the Office Action. (12 pages).
Office Action (Notification of Reasons for Refusal) dated Oct. 17, 2017, by the Japanese Patent Office in corresponding Japanese Patent Application No. 2016-569354, and an English Translation of the Office Action. (5 pages).
International Search Report (PCT/ISA/210) dated Apr. 5, 2016, by the Japanese Patent Office as the International Searching Authority for International Application No. PCT/JP2016/050643.
Written Opinion (PCT/ISA/237) dated Apr. 5, 2016, by the Japanese Patent Office as the International Searching Authority for International Application No. PCT/JP2016/050643.

* cited by examiner

AIR-CONDITIONING DEVICE FOR VEHICLE

TECHNICAL FIELD

The present invention relates to a vehicle air-conditioning apparatus in which waste heat from a heat source is recovered to use for air conditioning.

BACKGROUND ART

Conventionally, with the aim of reducing consumption energy in an air-conditioning apparatus for a vehicle, waste heat of an engine and a generator of a railroad vehicle may be recovered by circulating cooling water through the engine and the generator and the hot water heated by the waste heat may be used as a heat source for heating of the air-conditioning apparatus for the vehicle. In general, the temperature of the hot water largely depends on the usage status of the engine and thus may not become stabilized in many cases, and the hot water cannot be used if the temperature of the hot water is low. For this reason, air-conditioning apparatus that provide, even in a case where hot water cannot be obtained, excellent heating by using heating by a heat pump together while achieving energy saving by using hot water are proposed (e.g., see Patent Literature 1).

CITATION LIST

Patent Literature

Patent Literature 1: Japanese Unexamined Patent Application Publication No. 2006-248275

SUMMARY OF INVENTION

Technical Problem

In Patent Literature 1, if the temperature of hot water does not reach a predetermined temperature and thus heating by using the hot water cannot be performed, a heat pump is activated and heating is performed by using air heated by an indoor heat exchanger of the heat pump. However, heat pump is used as the only heat source other than hot water, and thus the following problems occur. That is, if the temperature of the hot water is low and the hot water cannot be used as a heat source for heating, there is a case where a required heating capacity cannot be obtained by the heat pump alone. In addition, if, for example, frost is deposited on an outdoor heat exchanger of the heat pump and thus a so-called inverse cycle-type defrosting operation is performed to remove the frost, heating by the heat pump cannot be performed during the defrosting operation.

The present invention is made in consideration of such problems, and an object of the present invention is to provide an air-conditioning apparatus for a vehicle capable of obtaining a required heating capacity even in a case where hot water cannot be used as a heat source for heating.

Solution to Problem

A vehicle air-conditioning apparatus of an embodiment of the present invention includes a hot water heater core provided in a hot water circuit in which cooling water circulates in a heat source to recover waste heat of the heat source, and configured to exchange heat between the cooling water heated by the waste heat of the heat source and air to heat the air, thereby heating an inside of a vehicle by using the heated air; a heat pump configured to exchange heat between a refrigerant discharged from a refrigerant compressor and air by using an indoor heat exchanger to heat the air, thereby heating the inside of the vehicle by using the heated air; an electric heater configured to heat air to heat the inside of the vehicle; and a controller configured to select at least one of the hot water heater core, the heat pump and the electric heater to perform heating.

Advantageous Effects of Invention

According to an embodiment of the present invention, a required heating capacity can be obtained even in a case where hot water cannot be used as a heat source for heating.

DESCRIPTION OF EMBODIMENTS

Embodiment 1

Figure 1:
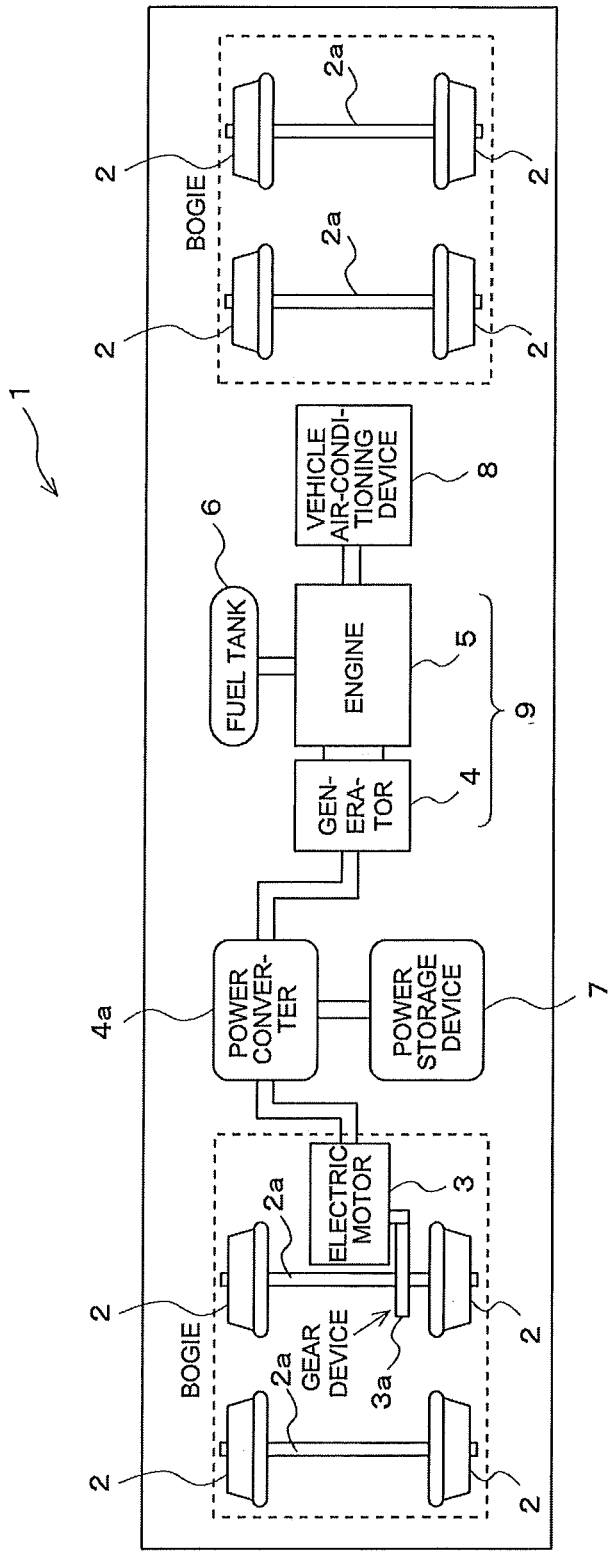
FIG. 1 is an overall schematic diagram of a railroad vehicle to which a vehicle air-conditioning apparatus according to Embodiment 1 of the present invention is applied.

FIG. 1 is an overall schematic diagram of a railroad vehicle to which a vehicle air-conditioning apparatus according to Embodiment 1 of the present invention is applied.

A railroad vehicle 1 includes wheels 2 for traveling on tracks, the wheels 2 being provided on axles 2a arranged at the front and the back of a vehicle body, an electric motor 3 that drives to rotate the wheels 2 provided at the front via a gear device 3a and the axle 2a, a generator 4 that supplies electric power to the electric motor 3 via a power converter 4a, and an engine 5 that drives the generator 4. In addition, the railroad vehicle 1 is formed of a power converter 4a, a fuel tank 6 that stores fuel to be supplied to the engine 5, a power storage device 7 that recovers regenerative electric power and supplies electric power to the electric motor 3 via the power converter 4a, a vehicle air-conditioning apparatus 8, and other devices. Drive electric power generated by the generator 4 and electric power from the power storage device 7 are supplied to the electric motor 3 via the power converter 4a to rotate the wheels 2.

The vehicle air-conditioning apparatus 8 performs cooling by means of a heat pump type refrigeration cycle (hereinafter referred to as "heat pump"), which will be described later, and performs heating by using waste heat generated and recovered from a power generation unit 9, which includes the generator 4 and the engine 5. The power generation unit 9 constitutes a heat source of an embodiment of the present invention. Note that the heat source is not limited to the generator 4 and the engine 5, which are power sources for driving the wheels 2, and may be a feeding unit that supplies electric power to service equipment (e.g., electric light, air-conditioning apparatus) of each vehicle.

Figure 2:
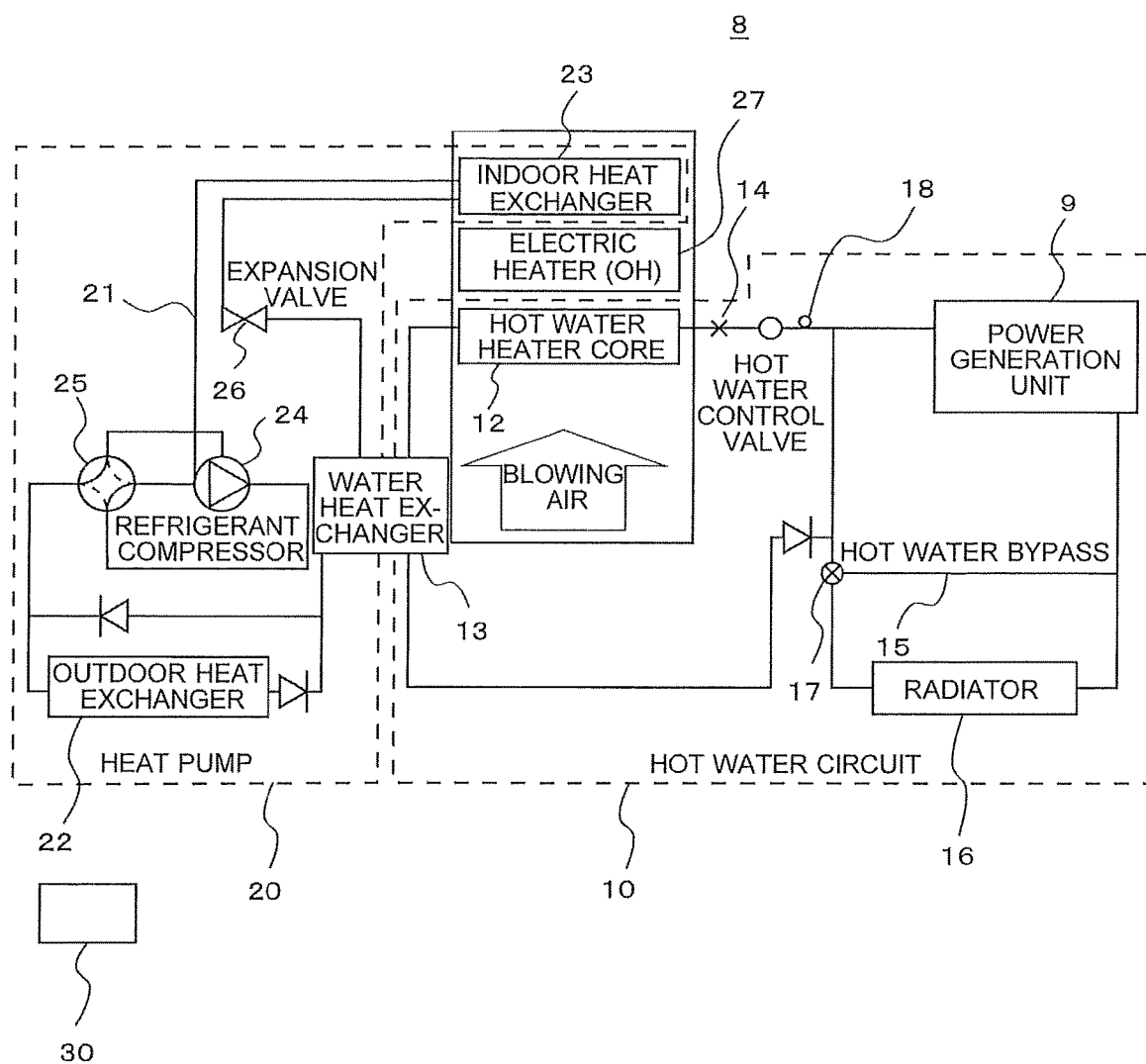
FIG. 2 is a block diagram illustrating a configuration of the vehicle air-conditioning apparatus according to Embodiment 1 of the present invention.

FIG. 2 is a block diagram illustrating a configuration of the vehicle air-conditioning apparatus according to Embodiment 1 of the present invention. The configuration of the vehicle air-conditioning apparatus 8 according to Embodiment 1 will be described below with reference to FIG. 2.

As illustrated in FIG. 2, the vehicle air-conditioning apparatus 8 is formed of a hot water circuit 10, a heat pump 20, a controller 30 and other devices.

The hot water circuit 10 includes a hot water heater core 12, a water heat exchanger 13, a hot water control valve 14, a hot water bypass 15, a radiator 16, and other devices, and these devices are connected by pipes to form a structure in which cooling water (hot water) for cooling the power generation unit 9 circulates.

The hot water heater core 12 is a heat exchanger for exchanging heat between hot water and air, and the air heated by the heat exchanger is used for air conditioning in the vehicle. The water heat exchanger 13 is a heat exchanger for exchanging heat between hot water and refrigerant of the heat pump 20. The hot water control valve 14 shuts off hot water to prevent the hot water from reaching the hot water heater core 12 and the water heat exchanger 13. In addition, the hot water control valve 14 prevents hot water from the power generation unit 9 from reaching the water heat exchanger 13, and thereby preventing the refrigerant in the heat pump 20 from being heated by waste heat generated from the power generation unit 9. The hot water bypass 15 brings the hot water shut off by the hot water control valve 14 back to the power generation unit 9. The radiator 16 cools the hot water having passed through the water heat exchanger 13 and the hot water shut off by the hot water control valve 14. The radiator 16 has an arrangement structure capable of easily releasing heat of hot water to the outside of the vehicle.

The hot water circuit 10 is provided with a thermostatic valve 17, as illustrated in FIG. 2. The thermostatic valve 17 controls the flow path of hot water in accordance with the temperature of the hot water that is made to flow to the hot water bypass 15 due to closing of the hot water control valve 14, or the temperature of the hot water that passed through the water heat exchanger 13 and is brought back to the power generation unit 9. If the temperature of the hot water flowing in the thermostatic valve 17 is equal to or greater than a predetermined threshold (e.g., 70 degrees C.), the thermostatic valve 17 makes all of the hot water flow to the radiator 16 for cooling and then brings the cooled water back to the power generation unit 9, thereby preventing overheating of the power generation unit 9. Meanwhile, if the temperature of the hot water flowing in the thermostatic valve 17 is equal to or lower than a predetermined threshold (e.g., 65 degrees C.), the thermostatic valve 17 makes all of the hot water flow to the hot water bypass 15, thereby preventing overcooling of the power generation unit 9.

In the hot water circuit 10, a temperature sensor 18 for detecting the temperature of the hot water that has been heated by waste heat generated from the power generation unit 9 and is supplied to the hot water heater core 12 is disposed in a pipe between the power generation unit 9 and the hot water heater core 12.

As shown in FIG. 2, the heat pump 20 includes the water heat exchanger 13, an outdoor heat exchanger 22, an indoor heat exchanger 23, a refrigerant compressor 24 for compressing refrigerant, an electric four-way valve 25 for changing the flow path of refrigerant between a cooling operation and a heating operation, an expansion valve 26, and other devices, and these devices are connected by refrigerant pipes to form a structure in which refrigerant circulates.

The water heat exchanger 13 exchanges heat between the hot water of the hot water circuit 10 and the refrigerant of the heat pump 20. The outdoor heat exchanger 22 exchanges heat between the refrigerant of the heat pump 20 and outside air to cool the refrigerant. The indoor heat exchanger 23 exchanges heat between the refrigerant of the heat pump 20 and air and is a heat exchanger for both cooling and heating. In a cooling operation, the indoor heat exchanger 23 exchanges heat between the refrigerant decompressed by the expansion valve 26 and air to cool the air. In a heating operation, the indoor heat exchanger 23 exchanges heat between the refrigerant heated by the water heat exchanger 13 and air to heat the air. The electric four-way valve 25 changes the flow path of the refrigerant between a cooling operation and a heating operation. By using the heat pump 20, both a cooling operation and a heating operation can be realized.

The vehicle air-conditioning apparatus 8 is further provided with an electric heater 27 for heating air to be supplied to the inside of the vehicle.

Note that the air heated by the hot water heater core 12, the indoor heat exchanger 23 and the electric heater 27 is supplied to the inside of the vehicle by using a fan (not shown) to warm up the inside of the vehicle. In Embodiment 1, according to a required heating capacity, the heat source for heating is used by appropriately selecting between the hot water having passed through the hot water heater core 12 and a heat source (either or both of the indoor heat exchanger 23 of the heat pump 20 and the electric heater 27) other than the hot water.

The controller 30 is a device that automatically controls the operation of the vehicle air-conditioning apparatus 8 based on the temperature of the hot water detected by the temperature sensor 18. Specifically, the controller 30 performs control so as not to use the hot water as the heat source for heating if the temperature of the hot water is lower than a predetermined threshold (25 degrees C.) in which air conditioning heating is possible, but to use another heat source to perform a heating operation. If the temperature of the hot water is equal to or greater than the predetermined threshold (25 degrees C.), the controller 30 uses the hot water as the main heat source for heating. Note that the controller 30 performs calculation of a capacity that is required in a heating operation, and if the hot water alone cannot cover the required heating capacity, another heat source is used to make up the shortage.

When frost is attached to the outdoor heat exchanger 22 of the heat pump 20, a defrosting operation is performed to remove the frost. In a defrosting operation, the controller 30 preforms defrosting by switching the electric four-way valve 25 to the side indicated by dotted lines in FIG. 2 to supply a high-temperature refrigerant gas discharged from the refrigerant compressor 24 to the outdoor heat exchanger 22.

The controller 30 may be formed of hardware, such as a circuit device that realizes the functions, or may be formed of a calculation device, such as a microcomputer or a CPU, and software to be executed thereon. In addition, the controller 30 includes a timer that counts time.

Figure 3:
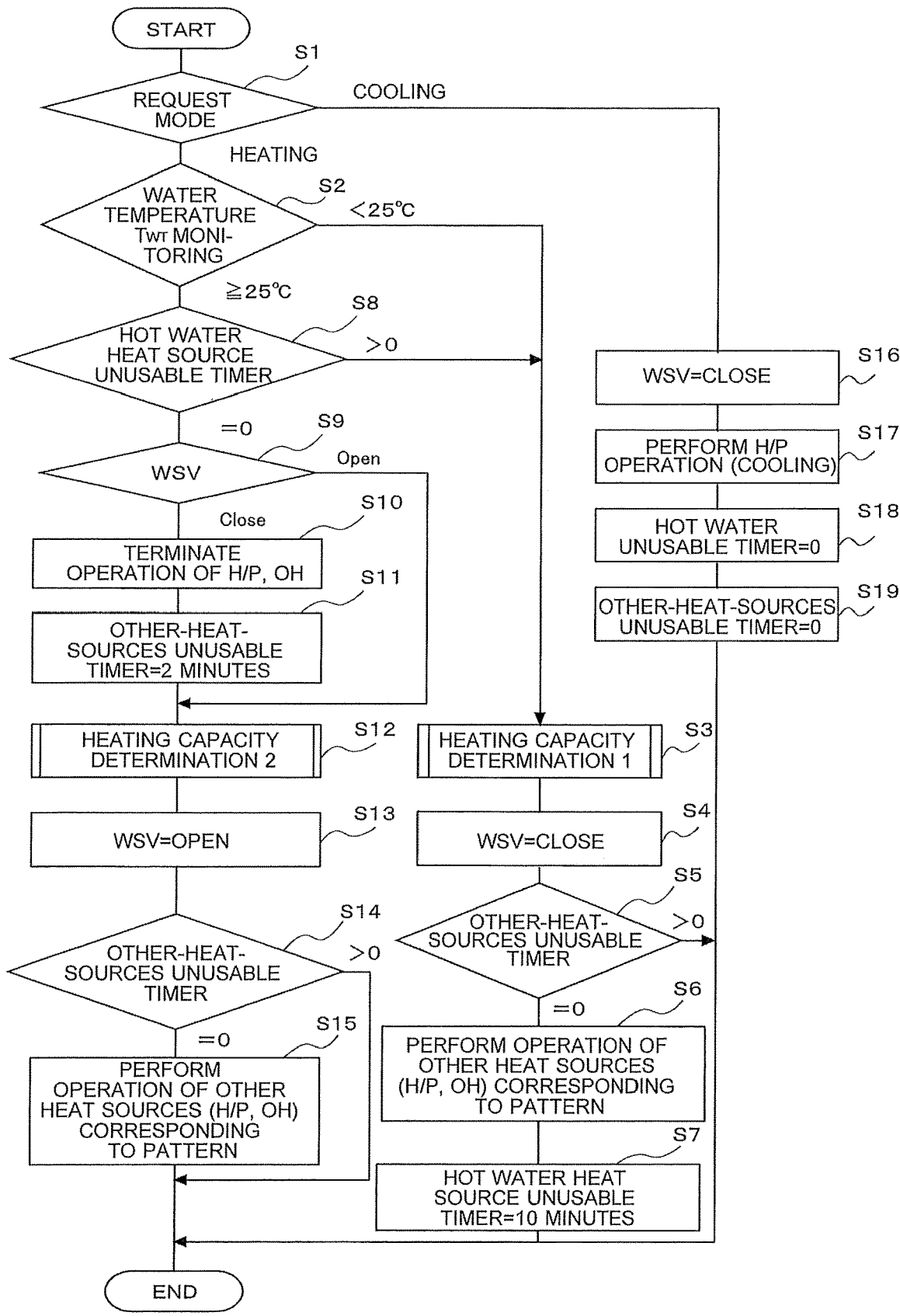
FIG. 3 is a control flowchart of the vehicle air-conditioning apparatus according to Embodiment 1 of the present invention.

FIG. 3 is a control flowchart of the vehicle air-conditioning apparatus according to Embodiment 1 of the present invention. The operation of the vehicle air-conditioning apparatus 8 according to Embodiment 1 will be described below with reference to FIG. 3. Note that, as a precondition, a hot water unusable timer T1 and an other-heat-sources unusable timer T2 each are set to an initial value "0".

If the operation mode requested by a user is a heating operation mode (S1), the controller 30 monitors a water temperature $T_{WT}$ detected by the temperature sensor 18 (S2), and compares the water temperature $T_{WT}$ with a threshold (25 degrees C.) in which air conditioning heating by using hot water is possible. If the water temperature $T_{WT}$ is less than the threshold, the controller 30 determines that heating cannot be performed by using hot water and that heating is performed by using another heat source.

Then, the controller 30 performs heating capacity determination 1 (S3). In the heating capacity determination 1, the controller 30 obtains a required heating capacity based on an outdoor temperature and an indoor temperature, and calculates an allocation ratio pattern to operate the heat pump 20 and the electric heater 27, which are other heat sources, by allocating the heating capacity to each of the heat sources. Comparing the heat pump 20 with the electric heater 27, the heat pump 20 requires less power consumption to obtain the same heating capacity, thereby saving energy. For this reason, of the heat pump 20 and the electric heater 27, the heat pump 20 is used as a main heat source for heating, and the electric heater 27 is used to assist the heating in a case of insufficient heating.

More specifically, if the heating capacity can be covered solely with the heat pump 20, only the heat pump 20 is operated and the electric heater 27 is stopped. When a temperature difference between the outdoor temperature and the indoor temperature is large and thus a required heating capacity exceeds a heating capacity covered sorely with the heat pump 20, an insufficient heating capacity is compensated for by the electric heater 27. Note that, in a case where the heat pump 20 performs a defrosting operation, or in a case of failure, etc., the heat pump 20 cannot be used and the heating capacity cannot be covered, and thus the electric heater 27 is used as a main heat source for heating. That is, in the heating capacity determination 1, according to the required heating capacity and the operation states of the heat pump 20, the heating operation is performed by using one or both of the heat pump 20 and the electric heater 27. Based on the above-mentioned idea, the allocation ratio pattern of the heating capacity is calculated.

Then, the controller 30 closes a hot water control valve (WSV) 14 of the hot water circuit 10 (S4). Consequently, hot water does not flow in the hot water heater core 12, and thus heating by using the hot water is not performed. In the hot water circuit 10, according to the temperature of hot water that has recovered waste heat of the power generation unit 9, the flow path for the hot water is switched by the functions of the thermostatic valve 17. That is, all the high-temperature hot water is brought to the radiator 16 to release the heat outside the vehicle and, after being cooled, is returned to the power generation unit 9. All the low-temperature hot water is made to flow in the hot water bypass 15 and is returned to the power generation unit 9.

Then, the controller 30 checks the other-heat-sources unusable timer (S5) before using other heat sources as a heat source for heating. If the value of the other-heat-sources unusable timer is greater than 0, the time after stopping the operation with other heat sources is short, and thus a restart using other heat sources will be suspended to prevent the operation using other heat sources from restarting in a short period of time. Here, the other-heat-sources unusable timer (S5) is set to the initial value, "0" and thus the operation using other heat sources (the heat pump (H/P) 20 and the electric heater (OH) 27) is performed with the allocation ratio corresponding to the pattern calculated in the heating capacity determination 1 in S3 to perform a heating operation (S6).

That is, when a heating operation is performed by using the heat pump 20, the electric four-way valve 25 is switched to the side indicated by solid lines in FIG. 2 and the refrigerant compressor 24 is activated to circulate refrigerant, and thereby the water heat exchanger 13 exchanges heat between hot water and the refrigerant to heat the refrigerant. Then, the heated refrigerant is compressed by the refrigerant compressor 24, the high-pressure refrigerant is made to pass through the indoor heat exchanger 23 to exchange heat with air to heat the air, and the heated air is sent to the inside of the vehicle for heating. When a heating operation is performed by using the electric heater 27, the electric heater 27 is turned ON and air heated by the electric heater 27 is sent to the inside of the vehicle for heating.

Then, the controller 30 sets the hot water unusable timer T1 to a prohibition time (e.g., 10 minutes) (S7), and starts a countdown of the hot water unusable timer T1. This first unusable timer is used to continue a heating operation using other heat sources without starting a heating operation using hot water even if the water temperature $T_{WT}$ detected by the temperature sensor 18 becomes equal to or greater than a threshold before the prohibition time elapses, and to switch to a heating operation using hot water after the prohibition time elapses. With this timer, frequent switching of heat sources is prohibited.

When the temperature of water in the hot water circuit 10 is raised by the waste heat generated from the power generation unit 9 and the water temperature $T_{WT}$ detected by the temperature sensor 18 becomes equal to or greater than a threshold (25 degrees C.) (S2), the controller 30 checks the hot water unusable timer T1 (S8). If the controller 30 determines that the hot water unusable timer T1 is greater than 0, that is, if the prohibition time has not elapsed yet, the heating operation using hot water is unusable, and the process proceeds to S3 to perform a heating operation using other heat sources. Meanwhile, if the controller 30 determines that the hot water unusable timer T1 is 0, that is, if the prohibition time has elapsed, the controller 30 checks whether the hot water control valve (WSV) 14 of the hot water circuit 10 is open or closed (S9). Here, the hot water control valve 14 is closed and a heating operation using other heat sources (either or both of the indoor heat exchanger 23 and the electric heater 27) is performed, and thus the controller 30 stops the heating operation using the heat pump (H/P) 20 and the electric heater (OH) 27 (S10), and sets the other-heat-sources unusable timer to 2 minutes (S11).

Then, the controller 30 performs heating capacity determination 2 (S12). In the heating capacity determination 2, the controller 30 obtains a required heating capacity based on an outdoor temperature and an indoor temperature, and calculates an allocation ratio pattern to allocate the heating capacity to hot water and other heat sources for operation. Among the hot water, the heat pump 20, and the electric heater 27, higher energy saving performance is obtained in the order of the hot water, the heat pump 20, and the electric heater 27, and therefore, the hot water is used as a main heat source for heating, and in a case of insufficiency heating, an allocation ratio pattern is calculated to use the heat pump 20 and the electric heater 27 in this order, as with the above-mentioned heating capacity determination 2.

Then, the controller 30 opens the hot water control valve (WSV) 14 (S13). Thus, the hot water is supplied to the hot water heater core 12 and the air heated by the hot water heater core 12 is supplied to the inside of the vehicle, and thereby a heating operation using the hot water is performed. In addition, by opening the hot water control valve (WSV) 14, the hot water having passed through the hot water heater core 12 is supplied to the water heat exchanger 13.

Then, the controller 30 checks the other-heat-sources unusable timer T2 (S14), and if the controller 30 determines that the other-heat-sources unusable timer T2 is greater than 0, that is, if two minutes have not elapsed after the stoppage of the previous operation using other heat sources, heating using only hot water is performed without performing operation of the heat pump 20 and the electric heater 27.

Meanwhile, if the other-heat-sources unusable timer T2 is 0, that is, if two minutes have elapsed after the stoppage of the previous operation using other heat sources, and if other heat sources (H/P, OH) are used in addition to the heating operation using hot water, operations of other heat sources are performed based on the allocation ratio pattern calculated in the heating capacity determination 2 in S10 (S15). Meanwhile, if operations of other heat sources are not needed, operations of other heat sources are not performed.

The above-mentioned processes are performed if a temperature difference between the indoor temperature and the set temperature in the vehicle is equal to or greater than 1 degree C. and therefore heating is required, and if the temperature difference between the indoor temperature and the set temperature in the vehicle is less than 1 degree C., operations of all heat sources are stopped resulting in a thermo-off state.

Furthermore, if the operation mode requested by a user is a cooling operation mode (S1), the controller 30 first closes the hot water control valve 14 of the hot water circuit 10 (S16). Consequently, according to the water temperature, the flow path for the hot water having passed through the power generation unit 9 is switched by the functions of the thermostatic valve 17. That is, all the high-temperature hot water is brought to the radiator 16 to release the heat outside the vehicle and, after being cooled, is returned to the power generation unit 9. All the low-temperature hot water is made to flow in the hot water bypass 15 and is returned to the power generation unit 9.

Then, the controller 30 starts a cooling operation by using the heat pump (H/P) 20 (S17). That is, the electric four-way valve 25 is switched to the side indicated by dotted lines in FIG. 2 to drive the refrigerant compressor 24. Consequently, the refrigerant compressed by the refrigerant compressor 24 flows into the outdoor heat exchanger 22 and exchanges heat with air thereby being condensed and liquefied. The condensed and liquefied refrigerant is decompressed at the expansion valve 26 after passing through the water heat exchanger 13, and then flows into the indoor heat exchanger 23. The refrigerant having flowed into the indoor heat exchanger 23 receives heat from air and evaporates, and then passes through the electric four-way valve 25 and is sucked into the refrigerant compressor 24 again. As described above, the inside of the vehicle is cooled by circulating the refrigerant in the refrigerant circuit. Then, the controller 30 sets the hot water unusable timer to 0 (S18), as well as sets the other-heat-sources unusable timer to 0 (S19).

As explained above, according to Embodiment 1, the configuration is made so as to use, in addition to hot water, the heat pump 20 and the electric heater 27 as heat sources for heating, and therefore, a continuous heating operation can be performed even in a case where hot water cannot be used. In addition, even in a case where the heat pump 20 cannot be used, the electric heater 27 can be used.

When the heating capacity obtained by using only hot water as a heat source is insufficient and the heat pump 20 and the electric heater 27 are used as additional heat sources, the allocation of the heating capacity is determined in consideration of the power consumptions of the heat pump 20 and the electric heater 27, thereby contributing to energy saving.

In addition, the vehicle air-conditioning apparatus 8 of Embodiment 1 has the water heat exchanger 13 that exchanges heat between cooling water (hot water) heated by waste heat generated from the power generation unit 9 and a refrigerant, and the indoor heat exchanger 23 that heats air by exchanging heat with the refrigerant heated by the water heat exchanger 13, and heating can be performed by using the air heated by the indoor heat exchanger 23. That is, the energy of the waste heat generated from the power generation unit 9 is stored in the indoor heat exchanger 23 via the water heat exchanger 13, and, by using the indoor heat exchanger 23, stable and comfortable hot-air heating can be realized.

Note that, in Embodiment 1, the configuration is made in such a manner that the heat pump 20 includes the water heat exchanger 13, however, the configuration may be made in such a manner that the water heat exchanger 13 is omitted but the refrigerant compressor 24, the electric four-way valve 25, the indoor heat exchanger 23, the expansion valve 26, and outdoor heat exchanger 22 are connected in this order to circulate refrigerant therein. In such a case, a high-temperature refrigerant gas discharged from the refrigerant compressor 24 flows into the indoor heat exchanger 23 and exchanges heat with air to heat the air, and the heated air is supplied to the inside of the vehicle, and thereby heating is performed.

Note that, the specific values of temperature and time indicated in Embodiment 1 are only exemplary and may be set, as appropriate, according to actual usage conditions, etc.

REFERENCE SIGNS LIST

1 RAILROAD VEHICLE 2 WHEEL 2a AXLE 3 ELECTRIC MOTOR 3a GEAR DEVICE 4 GENERATOR 4a POWER CONVERTER 5 ENGINE 6 FUEL TANK 7 POWER STORAGE DEVICE 8 VEHICLE AIR-CONDITIONING DEVICE 9 POWER GENERATION UNIT 10 HOT WATER CIRCUIT 12 HOT WATER HEATER CORE 13 WATER HEAT EXCHANGER 14 HOT WATER CONTROL VALVE 15 HOT WATER BYPASS 16 RADIATOR 17 THERMOSTATIC VALVE 18 TEMPERATURE SENSOR 20 HEAT PUMP 22 OUTDOOR HEAT EXCHANGER 23 INDOOR HEAT EXCHANGER 24 REFRIGERANT COMPRESSOR 25 ELECTRIC FOUR-WAY VALVE 26 EXPANSION VALVE 27 ELECTRIC HEATER 30 CONTROLLER

The invention claimed is:

1. A vehicle air-conditioning apparatus comprising:
  a hot water heater core provided in a hot water circuit in which cooling water circulates in a heat source to recover waste heat of the heat source, and configured to exchange heat between the cooling water heated by the waste heat of the heat source and air to heat the air, thereby heating an inside of a vehicle by using the heated air;
  a temperature sensor for detecting a temperature of the cooling water that has been heated by the waste heat;
  a heat pump configured to exchange heat between a refrigerant discharged from a refrigerant compressor and air by using an indoor heat exchanger to heat the air, thereby heating the inside of the vehicle by using the heated air;
  an electric heater configured to heat air to heat the inside of the vehicle; and a controller configured to select at least one of the hot water heater core, the heat pump and the electric heater to perform heating wherein the controller is configured to, when a temperature of the cooling water detected by the temperature sensor is equal to or greater than a predetermined threshold, operate the hot water heater core, the heat pump and the electric heater by allocating the required healing capacity to the hot water heater core, the heat pump and the electric heater in this order in such a manner that, if the required heating capacity can be covered with the hot water heater core, only the hot water heater core is used, and if not, the heat pump is used to cover a shortage, and if the heat pump still cannot cover the shortage, the electric heater is used to cover the shortage.

2. The vehicle air-conditioning apparatus of claim 1, wherein the controller is configured to, if a temperature of the cooling water heated by the waste heat of the heat source is less than a predetermined threshold, use the heat pump as a main heat source for heating.

3. The vehicle air-conditioning apparatus of claim 2, wherein the controller is configured to, when the heat pump is used as the main heat source for heating, operate the heat pump and the electric heater by allocating a required heating capacity to the heat pump and the electric heater in this order in such a manner that, if the required heating capacity can be covered with the heat pump, only the heat pump is used, and if not, the electric heater is used to cover a shortage.

* * * * *